US006704722B2

(12) United States Patent
Wang Baldonado (10) Patent No.: US 6,704,722 B2
(45) Date of Patent: Mar. 9, 2004

(54) SYSTEMS AND METHODS FOR PERFORMING CRAWL SEARCHES AND INDEX SEARCHES

(75) Inventor: Michelle Q. Wang Baldonado, Palo Alto, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/442,339

(22) Filed: Nov. 17, 1999

(65) Prior Publication Data
US 2002/0147880 A1 Oct. 10, 2002

(51) Int. Cl.[7] .............................................. G06F 17/30
(52) U.S. Cl. .............................. 707/3; 707/10; 715/513
(58) Field of Search ....................... 707/1–10; 715/513

(56) References Cited

U.S. PATENT DOCUMENTS

| | | | | |
|---|---|---|---|---|
| 5,493,667 A | * | 2/1996 | Huck et al. | 711/125 |
| 5,553,281 A | * | 9/1996 | Brown et al. | 395/600 |
| 5,778,372 A | * | 7/1998 | Cordell et al. | 707/100 |
| 5,818,978 A | * | 10/1998 | Al-Hussein | 382/296 |
| 5,819,220 A | * | 10/1998 | Sarukkai et al. | 704/243 |
| 5,842,206 A | * | 11/1998 | Sotomayor | 707/5 |
| 5,855,015 A | * | 12/1998 | Shoham | 707/5 |
| 5,875,446 A | * | 2/1999 | Brown et al. | 707/3 |
| 5,890,170 A | * | 3/1999 | Sidana | 707/501 |
| 5,913,208 A | * | 6/1999 | Brown et al. | 707/3 |
| 5,924,105 A | * | 7/1999 | Punch et al. | 704/7 |
| 5,963,965 A | * | 10/1999 | Vogel | 707/501.1 |
| 5,987,471 A | * | 11/1999 | Bodine et al. | 713/201 |
| 5,987,515 A | * | 11/1999 | Ratcliff et al. | 707/501.1 |
| 5,991,756 A | * | 11/1999 | Wu | 707/3 |
| 6,006,217 A | * | 12/1999 | Lumsden | 707/2 |
| 6,029,195 A | * | 2/2000 | Herz | 709/219 |
| 6,035,330 A | * | 3/2000 | Astiz et al. | 709/218 |
| 6,038,668 A | * | 3/2000 | Chipman et al. | 713/201 |
| 6,061,682 A | * | 5/2000 | Agrawal et al. | 707/6 |
| 6,101,503 A | * | 8/2000 | Cooper et al. | 707/104 |
| 6,182,063 B1 | * | 1/2001 | Woods | 709/223 |
| 6,182,091 B1 | * | 1/2001 | Pitkow et al. | 707/501.1 |
| 6,195,696 B1 | * | 2/2001 | Baber et al. | 709/223 |
| 6,301,614 B1 | * | 10/2001 | Najork et al. | 709/223 |
| 6,411,952 B1 | * | 6/2002 | Bharat et al. | 704/243 |

FOREIGN PATENT DOCUMENTS

| | | |
|---|---|---|
| CA | 2243724 | 1/1999 |
| EP | 0 457 705 A2 | 11/1991 |

OTHER PUBLICATIONS

Lawrence et al., Searching the World Wide Web, Apr. 1998, vol. 280, pp. 98–100.*
Sheldon et al., Discover: a resource discovery system based on content routing, Apr. 1995, vol. 27, pp. 953–972.*
"Sphinx: a framework for creating personal, site–specific Web crawlers", Robert C. Miller et al., School for Computer Science, Carnegie Mellon University, Pennsylvania, Sep. 16, 1999, Sep. 17, 1999, pp 1–12.
"Autonomous Interface Agents", Henry Lieberman, Proceedings of the ACM Conference on Computers and Human Interface, CHI '97, Georgia, Mar. 1997, Sep. 17, 1999, pp 1–12.
"Information Retrieval in Distribution Hypertexts", Paul De Bra et al., RIAO–94 Conference, New York, Sep. 17, 1999, pp 1–12.

(List continued on next page.)

Primary Examiner—Greta Robinson
Assistant Examiner—Sathyanarayan Pannala
(74) Attorney, Agent, or Firm—Oliff & Berridge, PLC; Eugene Palazzo (57) ABSTRACT

The systems and methods described herein allow a user to perform localized searching from a standard web browser. In particular, the systems and methods of this invention use a two-prong approach to accomplish both a dynamic breadth-first crawl search and a contextualize index search to generate search results. The search results are then assembled in a unified results page and displayed to a user.

32 Claims, 7 Drawing Sheets-

OTHER PUBLICATIONS

"WebCutter: A System for Dynamic and Tailored Site Mapping", Yoelle S. Maarek et al., Sixth International World Wide Web Conference, pp. 714–722, Sep. 17, 1999, Nov. 16, 1999.

"Searching for Arbitrary Information in the WWW: the Fish–Search for Mosaic", P.M.E. De Bra et al., Eindhoven University of Technology, Department of Computing Science, the Netherlands, Sep. 17, 1999, Nov. 16, 1999, pp 1–10.

"The shark–search algorithm—An application: tailored Web site mapping", Michael Hersovic et al., IBM Haifa Research Laboratory, Israel, Sep. 17, 1999, Nov. 16, 1999, pp 1–12.

"Information Retrieval in the World–Wide Web: Making Client–based searching feasible", P.M.E. De Bra et al., First World Wide Web Conference, Geneva, Sep. 17, 1999, Nov. 16, 1999, pp 1–14.

"Finding Information on the Web", P.M.E. De Bra et al., Information Systems Section, Department of Computing Science, Eindhoven University of Technology, the Netherlands, Nov. 16, 1999, pp 1–14.

"Sphinx: a framework for creating personal, site–specific Web crawlers", Robert C. Miller et al., School for Computer Science, Carnegie Mellon University, Pennsylvania, Sep. 17, 1999, pp 1–12.

"Autonomous Interface Agents", Henry Lieberman, Proceedings of the ACM Conference on Computers and Human Interface, CHI '97, Georgia, Sep. 17, 1999, pp 1–12.

"Information Retrieval in Distribution Hypertexts", Paul De Bra et al., RIAO–94 Conference, New York, Sep. 17, 1999, pp 1–12.

"Finding Information on the Web", P.M.E. De Bra et al., Information Systems Section, Department of Computing Science, Eindhoven University of Technology, the Netherlands, Sep. 17, 1999.

"Letizia: An Agent That Assists Web Browsing", Henry Lieberman, Proceedings of the International Joint Conference on Artificial Intelligence, Montreal, Aug. 1995, pp 1–2.

"WebGlimpse—Combining Browsing and Searching", Udi Manber et al., http://glimpse.cs.arizona.edu/, Jan. 10, 1997, pp 1–14.

"Search Utilities", Danny Sullivan, Search Engine Watch, http://searchenginewatch.com/, 1996, pp 1–4.

"Specialty Search Engines", Danny Sullivan, Search Engine Watch, http://searchenginewatch.com/. 1996, pp 1–6.

"Bookmarklets—free tools for power surfing", http://www.bookmarklets.com/, Dec. 14, 1998.

"Creating Bookmarklets", Yehuda Shiran et al., http://www.webreference.com/js/column35/creating.html, Sep. 17, 1999.

"Writing embedded date bookmarklets", John Barger, http://www.robotwisdom.com/web/bookmarklets.html. Sep. 17, 1999.

* cited by examiner

SYSTEMS AND METHODS FOR PERFORMING CRAWL SEARCHES AND INDEX SEARCHES

BACKGROUND OF THE INVENTION

1. Field of Invention

This invention relates to search systems for distributed networks.

2. Description of Related Art

A plethora of available "search engines" are available on the Internet for locating information about a particular topic. Specifically, a user, after typing in a Uniform Resource Locator (URL) of a "search engine," for example, Yahoo®, Infoseek®, Lycos® or AltaVista®, will typically arrive at a screen at which the user can enter one or more keywords. These keywords generally correspond to a distillation of the important concepts pertaining to the particular piece of information the user is seeking. Upon entering these keywords, and pressing the "search" button, for example, with the click of a mouse, the user is returned a result list of information sources or "hits" which the search engine found in its index and determined to be relevant to the user's query.

The user then typically scans the result list determining which of the particular results is most relevant. The user then can click on a result, or a "hit," and be taken, via hyperlink, to the actual information source, e.g., web page, that corresponds to the hit.

Once at the web page, the user can then browse the page looking for the specific information item that corresponds to the submitted query. Upon completion of the review of this particular web page, a user generally presses the "back" button on their browser interface to return to the result page generated by the search engine. The user then again selects a result and follows that result's hyperlink in the same manner as described above. This process continues until the user locates the desired information.

SUMMARY OF THE INVENTION

Existing search engines are fast and produce ranked results. However, the accuracy of their ranked results is based on the internal indices generated at the specific search engine. If the indices are not routinely maintained, incomplete indices produce inaccurate results, the indices may contain broken links to web pages that may have moved location and the indices may be missing links that have been updated since the last regeneration of the index.

Furthermore, existing search engines do not take into account the user's current context, e.g. the current virtual location that the user is browsing. Accordingly, if a user wants to find information within the currently viewed web site about a particular topic, the user must choose from five options. First, the user can use a global search engine and supplement the query with words that are likely to be associated with the current web site, e.g., the name of the company to which the web site belongs. This requires expertise on behalf of the user and is not guaranteed to produce only results from the site in question. For example, in an exemplary index based search engine, such as Yahoo®, AltaVista® or Excite®, the search engine receives the user's input keyword. This input keyword or words is then compared to the search engine's index. A correlation is then made between the keyword and the frequency of occurrence within the index. This correlation produces a result list that can then be organized, or ranked, based on this correlation.

Second, the user can perform an "advanced search" at some global search engine and specify that results must be from the current web site. In this case, the results will indeed be guaranteed to come from the site in question, but the user may not receive a satisfactory set of results due to the incompleteness and staleness of most search engine indices. In addition, this type of search requires expertise on the part of the user.

Third, the user can look for a locally provided search interface on the web site itself. The locally provided search interface may be hard to find, i.e. not available at the current location the user is browsing, it may have an idiosyncratic syntax and it may not be up-to-date.

Fourth, the user can manually browse the site searching for specific information. At a complex site, this could be time consuming and error prone.

Finally, the user can contact the administrator of the web site. This is a slow process, is not always possible and may not produce any results.

The systems and methods of this invention enable a user to perform a search more easily by combining index searching and crawl-based searching. Furthermore, the systems and methods of this invention enable context information to be included with either or both of the index search and the crawl search to further refine the scope of the search. Specifically, by recognizing the user's current context, e.g., virtual location or Uniform Resource Locator (URL), by performing a contextualized index search on behalf of the user, and by performing a contextualized crawl looking for results that match the user's query, this invention provides a non-expert user with localized search results in a timely and comprehensive fashion.

Specifically, in a crawl type search, a combination of keywords, context and boundary information are used to conduct a search within a specified area of a distributed network. Since this approach operates in real-time or near real-time, a number of the drawbacks encountered with an index type search are overcome.

The systems and methods of this invention combine index type searching and crawl type searching.

This invention separately provides systems and methods for assisting users in conducting a search of one or more distributed networks.

This invention separately provides systems and methods that allow a user to interface with a search tool via a user interface.

This invention separately provides systems and methods that allow users to customize search strategies to be applied to one or more distributed networks.

The search systems and methods of this invention use a combination of index based search strategies, crawl based search strategies and context information to provide a comprehensive lists of results to a user. In particular, a user enters one or more keywords corresponding to information on a desired topic. The systems and methods of this invention receive the query and perform, either serially or in parallel, an index search of a preexisting index and a crawl search within a particular context. The results of these queries are then assembled and displayed to the user. Thus, the results displayed to the user are comprehensive and the combination of the two queries complement each other in overcoming their individual shortcomings.

These and other features and advantages of this invention are described in or are apparent from the following detailed description of the preferred embodiments.

BRIEF DESCRIPTION OF THE DRAWINGS

The preferred embodiments of the invention will be described in detail, with reference to the following figures, wherein.

DETAILED DESCRIPTION OF PREFERRED EMBODIMENTS

By combining crawl type searches and index type searches in an amalgamated "search engine," a user is provided with a unique list of results. Furthermore, by combining contextualized crawl-based searches and contextualized index-based searches in an amalgamated "context-aware search engine," a user is provided with a unique contextualized list of results no matter what site is currently being visited.

Specifically, a crawl type search is more likely to find high quality results, but generally requires more time to execute and greater network bandwidth. On the other hand, index type searching is generally likely to return results quickly, but some of the results may point to items that are no longer in existence, and not all relevant results may be found. For example, search engines do not currently have the ability to index the entirety of a distributed network, such as the Internet. Furthermore, the rate of change for any one of these given indices is generally slower than the average number of updates for a given web site.

The systems and methods of this invention allow users to perform searching which minimizes disruption to the real task at hand. Specifically, by providing a context-aware search tool, the boundaries between searching and browsing become more fluid. The systems and methods of this invention also enable users to retrieve search results quickly, even if the machine from which the search is initiated is a relatively "slow" machine, e.g., because the machine has a slow processor, a single thread of execution or a slow network connection. The dual-prong search strategy of this invention allows users to quickly obtain matches within the context that are available in a global index, while at the same time finding matches on pages within the current context that are not in the index, e.g., newly introduced pages, newly edited pages, pages in an obscure location that are not indexed, pages that may be present behind a firewall, or the like.

Figure 1:
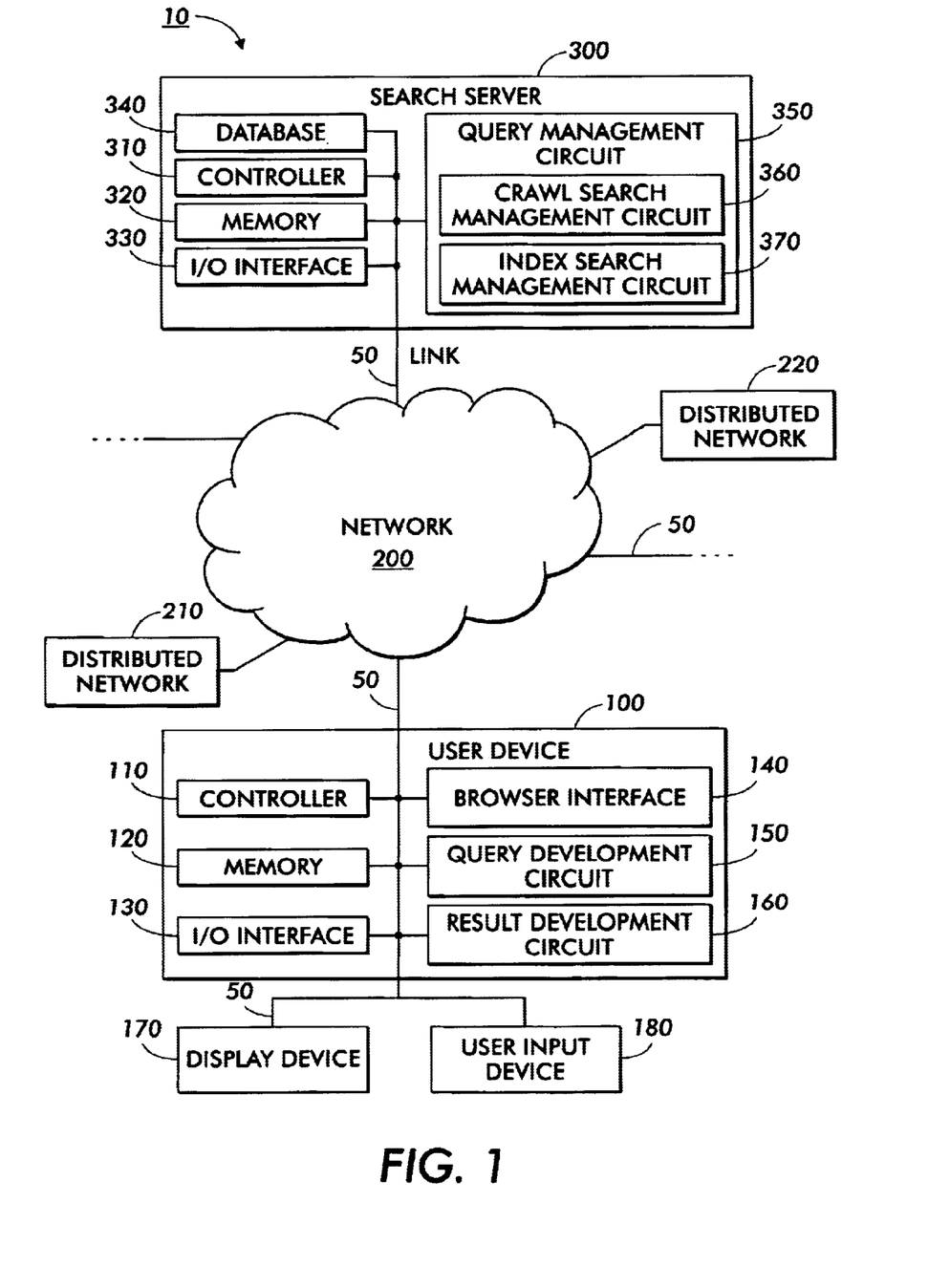
FIG. 1 is a functional block diagram showing a first embodiment of a search system according to this invention.

FIG. 1 illustrates one embodiment of the components of a contextualized search system 10 used during a distributed network search. The contextualized search system 10 includes a user device 100. The user device 100 comprises a controller 110, a memory 120, an I/O interface 130, a browser interface 140, a query development circuit 150 and a result development circuit 160. These elements are linked via link 50. Additionally, the user device 100 is connected to a displayed device 170 and a user input device 180 via link 50. The user device 100 is also connected to at least one distributed network 200 which may or may not also be connected to one or more other user devices, servers, databases, or other distributed networks 210, 220.

The contextualized search system 10 also comprises a search server 300. The search server 300 comprises a controller 310, a memory 320, an I/O interface 330, at least one database 340, and a query management circuit 350. The query management circuit 350 comprises a crawl search management circuit 360 and an index search management circuit 370.

While the exemplary embodiment illustrated in FIG. 1 shows the user device 100 and the search server 300 located at distant portions of a distributed network, such as a local area network, a wide area network, an intranet and/or the Internet, it should be appreciated that the components of the search server 300 and the user device 100 could be combined into one device or collocated on a particular node of a distributed network. As will be appreciated from the following description, and for reasons of computation efficiency, the components of the user device 100 and the search server 300 can be arranged at any location within a distributed network without affecting the operation of the system.

Furthermore, the links 50 can be a wired or wireless link or any known or later developed element(s) that is capable of supplying electronic data to and from the connected elements.

In operation, a user determines that information regarding a particular topic within a current context is desired. For example, a user could start a web browser, which is managed by the browser interface 140, such as Netscape Navigator® or Microsoft's® Internet Explorer®, for browsing of the Internet. Upon preliminary browsing of a web site with a web browser, the user determines additional information regarding a particular topic within the current context is desired. Instead of clicking on a hyperlink to, or entering the URL of a traditional search engine, such as AltaVista®, a user invokes a search in accordance with this invention. For example, the search can be invoked by including a clickable button in a toolbar of a web browser, such as Netscape Navigator®, by executing a program such as a JavaScript routine, a dedicated button within the operating system graphical user interface, a dedicated hardwired button, or any other well-known method of triggering execution of a program. For example, invocation of the search system can be accomplished by a user selecting, for example, with the click of a mouse, a button on a toolbar of a web browser, that in turn executes the search systems and methods of this invention.

Upon initialization of the search, the user device 100, in cooperation with the query development circuit 150, generates a keyword entry dialog box on the display device 170. This keyword entry dialog box generally operates in a similar fashion to the keyword entry dialog boxes seen on conventional Internet search engines. Thus, the keyword(s) generally correspond to a distillation of the important concepts pertaining to the particular piece of information the user is seeking.

A user, via user input device 180, then enters one or more keywords into the keyword entry dialog box. Alternatively, instead of a user entering one or more keywords through a keyword entry dialog box, the browser interface 140 can detect highlighted or selected portions within a document, such as a web page, displayed in the web browser. For example, if a user highlights text, for example, by holding down the left mouse button and traversing a portion of text within a web page, the highlighted portion can be automatically copied and used as the keyword information when the initialize search button is selected. These keywords are transferred, via link 50, and I/O interface 130, with the aid of controller 110 and memory 120, to the query development circuit 150.

The query development circuit 150 performs a number of tasks. First, the query development circuit 150 receives the one or more keywords from the user input device 180 and stores them in the memory 120. Additionally, the query development circuit 150 communicates with the browser interface 140 to determine the current virtual location, or context, of the user within the distributed network. Alternatively, the context information can be forwarded directly with the one or more keywords. For example, as previously discussed, the keyword entry dialog box can also have a portion that allows entry of the context information for the search. Thus, this context information could include, but is not limited to, a Uniform Resource Locator (URL), an Internet Protocol address (IP address), a File Transfer Protocol address (FTP address), a directory, a domain name, a universal resource name, or the like.

Having the context and keyword information, the query development circuit 150 initiates the search. In particular, the query development circuit assembles two different queries which are submitted to the search server 300. The first query is a crawl search. The crawl search comprises the context information as well as the keyword information entered by the user or detected in cooperation with the browser interface 140 and the user input device. As previously discussed, this context information can correspond to the URL of, for example, the web page at which the user requested the search services.

Alternatively, the context information can be edited by the user in order to more explicitly delineate the context. For example, if the user, while surfing, browsed to a web site having a URL of www.example.com, the context information could be the URL itself, i.e., www.example.com. Alternatively, the context information could include one or more wildcards to account for varying structures in the example.com web site. For example, the context information could be:

*.example.com

In this example, the "*" represents a wildcard that indicates any prefix within the URL "example.com" would also be queried during the crawl search. Additionally, it should be appreciated that highly specialized context information can also be directly entered by a user and combined with the keyword information to customize a particular query, without the need of a user actually browsing to a particular web page.

For example, if the example.com web site had a special section on trademarks, and the trademark section was broken into a "recent developments" section and a "historical" section, the user may edit the context information to specifically target a particular area of the web site. For example, the context information could be:

www.example.com/trademarks/current/*

This context information would allow a search for the keywords within the "current" portion or directory of the trademark portion of the example.com web site. Alternatively, a combination of web sites could be specified as the context information. For example, a user may specify the context information as "www.example.com" and "www.example2.com." In general, any information pointing to one or more locations in a distributed network can be used as the context information.

The combination of the keyword and context information is then submitted, via link 50 and the network 200, to the search server 300. The search server 300 receives the query and context, via I/O interface 330, in the query management circuit 350. The query management circuit 350 forwards the query and context information to the crawl search management circuit 360. The crawl search management circuit analyzes the received keywords and context information. In accordance with the context information, the crawl search management circuit 360 determines the crawl boundaries corresponding to the context information. These crawl boundaries regulate the breadth of the crawl search within the distributed network.

Alternatively, the crawl search management circuit 350 can allow changes to the context information. For example, the crawl search management circuit 350 can return a prompt to the user, prior to or during the course of the search, asking whether the determined context information is acceptable, or if changes, or a custom crawl context information is desired.

Having established the crawl boundaries, the context is added to a crawl queue. At the direction of the crawl search management circuit 360, and in conjunction with the controller 310 and the memory 320, the crawl search is executed on the documents or the information, e.g., the web pages, within the context of the crawl queue. Specifically, the submitted keywords are searched for within the context stored in the crawl queue. Once the context in the crawl queue has been searched, the context in the crawl queue is removed.

The results that match both the context information and the keyword(s) are then added to a result list stored in memory 320. The crawl search management circuit 360 then adds to the crawl queue the contexts, if any, that correspond to the one or more links found during the crawl that are within the crawl boundaries. The crawl search management circuit 360 then determines if the crawl queue is empty. If the crawl queue is empty, the crawl search is complete. If the crawl queue is not empty, the crawl search management circuit 360 continues searching within the context added to the crawl queue as described above.

Figure 2:
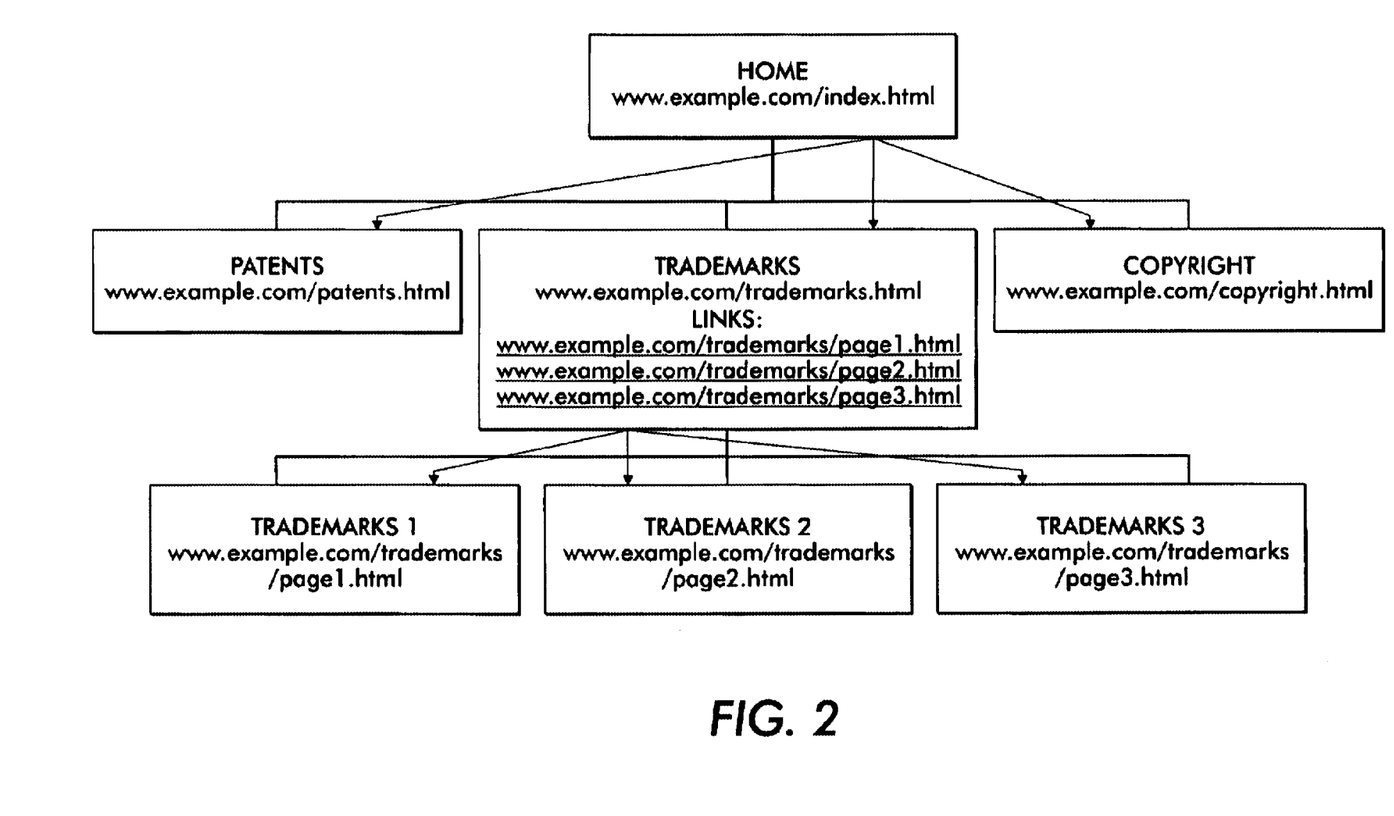
FIG. 2 shows an exemplary web page tree structure.

For example, FIG. 2 illustrates an exemplary web site tree structure for the web site "example.com." The web site has a "home page," e.g., www.example.com/index.html, a patents page, e.g., www.example.com/patents.html, a trademarks page, e.g., www.example.com/trademarks.html, a copyright page, e.g., www.example.com/copyright.html, and a plurality of supplemental pages with information on trademarks, e.g., page1.html—page3.html.

For example, assume a user is looking for information on trademarks. Additionally, assume the user is located at the www.example.com home page upon execution of the search. The crawl search would develop as follows. The initial context information could correspond to the web page from which the query was invoked, i.e., www.example.com. Thus, all web pages within the example.com web site could be queried. This context would be added to the crawl queue. The crawl search would then be executed on the context information stored in the crawl queue. In this illustrative example, results would be returned that corresponded to the patents, trademarks, and copyright web pages. Upon completion of the crawl search, the context within the crawl queue is removed.

Each of the result pages would then be analyzed to determine whether they match the crawl search conditions. Specifically, the crawl search management circuit 360 determines whether each of the result web pages contain the desired keyword(s), e.g., trademark. If so, the result is added to the result list. If not, the results are discarded. In this illustrative example, the "trademarks" web page would be added to the result list as having met the crawl search conditions. Having added to the results list the results from the crawl search that match the crawl query, the contexts corresponding to the link(s) found during the crawl are added to the crawl queue.

Thus, since the crawl boundaries in this illustrative example are all web pages within the www.example.com website, the crawl search would continue to search the sub-pages underneath the trademarks web page. For example, assume the trademarks web page has links to three additional pages with information on trademarks, illustrated as page1.html, page2.html, and page3.html. As the crawl search parses the trademarks page, i.e., www.example.com/trademarks.html, the links within the page, illustratively underlined in the trademark web page, are added to the crawl queue. The system would then check the crawl queue and proceed to execute the crawl search on each of the trademark pages that fall beneath the main trademarks page.

However, it should be appreciated that even though a web page may not contain the searched for keywords, the links within that page can be added to the crawl queue. Therefore, all pages within a given context can be searched.

The query management circuit 350 also forwards the query, and optionally the context, to the index search management circuit 370. Specifically, the index search, which also comprises the user entered keywords, and optionally context information, is forwarded from the query development circuit 150, via link 50, network 200 and I/O interface 330 to the query management circuit 350. The query management circuit 350 directs the index search to the index search management circuit 370. An index search based on a search of a preexisting index or indices at, for example, a search engine such as AltaVista® is then performed.

As with the crawl search, the index search management circuit 370, in cooperation with the controller 310 and the memory 320, can query the user whether the desired context information should be edited, or alternatively, whether context information is desired at all. For example, as described above, the index search management circuit 370 could forward a prompt to the user at user device 100 requesting amendments to, or deletion of, the context information. Then, based on the finalized context information, the index search management circuit 370, at the direction of controller 310, performs a search on a preexisting index stored in database 340.

As with the crawl search, the index search management circuit 370 can also restrict the search to information only within a desired context. For example, some search engines allow only keyword information to be entered as the search criteria, while other search engines allow both keyword and context information to be entered. Thus, in addition to management of the query itself, the index search management circuit 370 is also capable of determining what type of search engine, i.e., keyword only or keyword plus context, the index search is being forwarded to. Accordingly, the index search management circuit 370 can interact with a user or automatically assemble the query information based on the type of search engine to which the index search is being submitted.

Additionally, it is to be appreciated that the index search need not be submitted to any of the commercially known search engines, nor that the index search be actually performed by one of the commercially available search engines. To the contrary, as would be apparent to one of ordinary skill in the computer arts, the systems and methods of this invention could also develop and/or maintain an index comparable to commercial search engines on, for example, database 340. In this case, the transmission of the index search to another search engine would not be required.

Furthermore, it should be appreciated that the systems and methods of this invention are capable of directly accessing and performing queries on one or more indices not stored on database 340. Specifically, the search systems and methods of this invention can directly search an index without the need of forwarding the keywords and/or context information to another "search engine" that actually performs the search.

In general, the index search will work equally well if the index search management circuit 370 actual performs the search, or if the index search is forwarded to another search engine which performs the search and returns the results to the index search management circuit 370.

The crawl search management circuit 360 and the index search management circuit 370, upon completion of the execution of their respective searches, forward the results back to the result development circuit 160, illustratively located in user device 100. In particular, the query management circuit 350, via link 50, network 200 and I/O interface 130 returns the results of the search, or hits, to the result development circuit 160. The result development circuit 160 assembles the list of results for display on display device 170 to the user. The result development circuit 160 generates a display, for example, in the form of a graphical user interface, that illustratively contains both the results of the crawl search and the index search. As with a traditional search engine, the result page generated by the result development circuit 160 can include hyperlinks that link information pertaining to the result to each of the result pages. The result page is then displayed on display device 170.

Having displayed the results of the crawl search and the index search on the display device 170, the user can then select, with a user input device in a conventional search engine, such as by a click of a mouse, information within the results page. The user is then forwarded to the web page corresponding to the result.

In addition to the above illustrated exemplary operating mode, context information could also be edited prior to submission of the search. Furthermore, the context information could be edited "on-the-fly". For example, as either the crawl search or the index search is being performed, the query management circuit 350 could forward prompts to the user device 100 asking whether a certain link, or thread, should be followed, or included into the query context.

Additionally, it should be appreciated that the search systems and methods according to this invention are not limited to strict keyword searches. For example, as with current "advanced" search engine technologies, queries which, for example, may contain Boolean operations, may also be used in cooperation with the systems and methods of this invention. In general, it should be appreciated that any known or later-developed specialized techniques used within the context of either crawl searches or index searches could be combined with the systems and methods of this invention.

Furthermore, as previously discussed, the query management circuit 350 need not be located on a "search server" or search engine. Alternatively, for example, due to reasons of computational efficiency, the query management circuit 350 could be located on a specialized search server, or within the user device 100 itself.

Furthermore, it should be appreciated that while the exemplary embodiment illustrated in FIG. 1 includes a database 340 in the search server 300, the database 340 could be located anywhere in the distributed network. In general, as long as a database contains an index of at least a portion of a distributed network, the database can be present anywhere on the distributed network.

Additionally, it should be appreciated that the user could also govern which particular index or indices the index search is to be performed on. Specifically, in addition to context information, a user could also forward, via the query development circuit 150, specific index information indicating one or more index databases to be searched. For example, the user could indicate that both the Infoseek® and Lycos® indices are to be searched.

Figure 3:
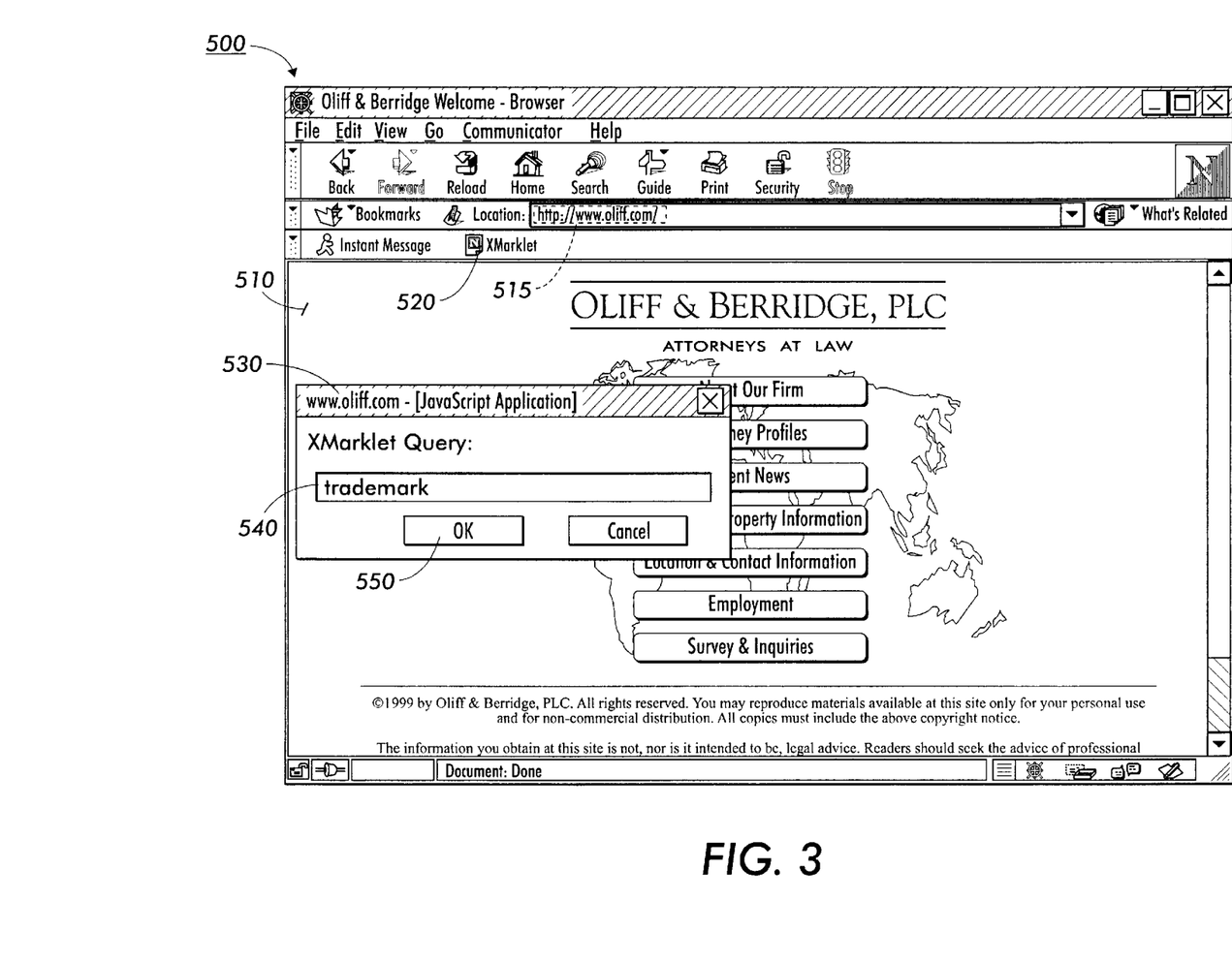
FIG. 3 shows a first exemplary web page implementing the systems and methods of this invention.

FIG. 3 illustrates an exemplary user interface. This illustrative user interface shows an exemplary web browser window 500 appearing on display device 170 as a user traverses a distributed network, or, for example, surfs the Internet. The user interface 500 comprises a web page 510, a URL 515, an initialize search button 520, a keyword entry dialog box 530, one or more keywords 540 and a perform search button 550.

Upon browsing to a web page, for example, exemplary web page 510, a user determines that a search of this web site is needed to locate specific information. At this point, the user selects, for example, with a click of a mouse, the initialize search button 520. Upon selection of this button, the keyword entry dialog box 530 appears. The keyword entry dialog box 530 allows a user to enter one or more keywords and can optionally allow construction of advanced search queries containing, for example, Boolean operations. For example, the keyword entry dialog box 530 could also contain, for example, radio buttons or other graphical user interface indicating, for example, an "AND" type operational search relationship between the two or more keywords. Additionally, the keyword entry dialog box 530 could contain a location for entering or editing the context information, not shown, which could in default correspond to the URL 515 of the web page from which the search was initiated.

Upon entry of one or more keywords 540, and/or context information, a user would select, for example, with the click of a mouse, the perform search, or "OK" button 550. At this time, as previously discussed, the query development circuit 150 will assemble the context information and keyword(s) for forwarding to the query management circuit 350.

Figure 4:
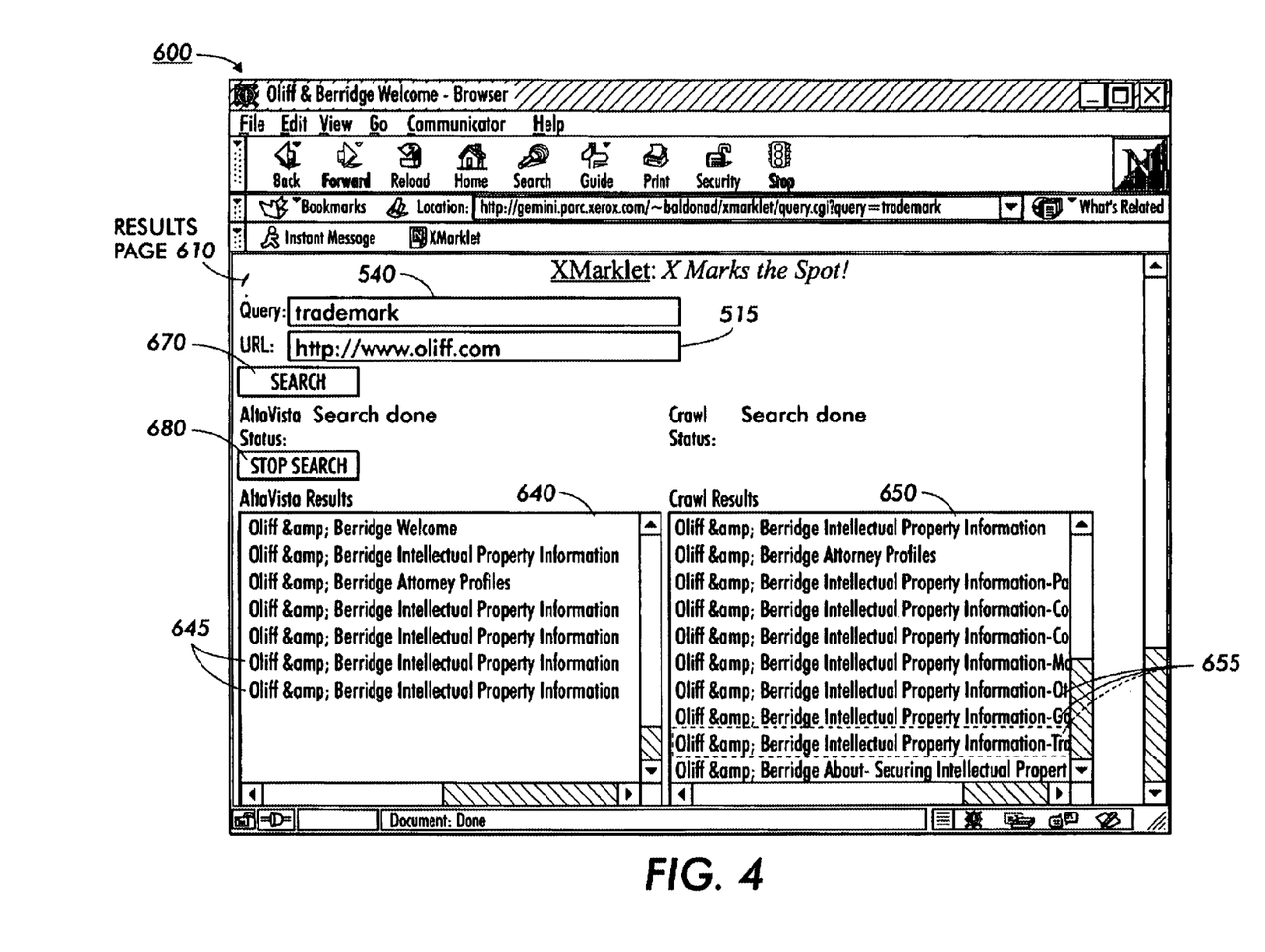
FIG. 4 is a second exemplary web page illustrating the results of an exemplary search performed by the search systems and methods of this invention.

FIG. 4 illustrates an exemplary results page that could be generated by the result development circuit 160. Specifically, the results page 610, displayed, for example, within a browser interface 600, illustratively comprises a location for displaying the one or more entered keywords 540, the context information 515, e.g., the URL, an index search results portion 640, a crawl search results portion 650, one or more index search results 645, one or more crawl search result lists 655, a search button 670 and a stop search button 680.

The results page 610 can be generated "on-the-fly" as the search progresses, or assembled upon the completion of either one or both of the crawl search and the index search, or any combination thereof. Additionally, while the results page 610 is shown as a web page within a browser interface window, it should be appreciated that the results page could also be layered on top of the web page 510 in a manner similar to the keyword entry dialog box 530, or other displaying technique as is well known to one of ordinary skill in the computer arts.

Therefore, upon completion of the crawl search and the index search, the individual results, or hits, appear in their respective index search 640 or crawl search 650 result boxes. As with current search engines, the results, or hits, displayed in these boxes contain hyperlinks to the actual web page, or portion thereof, which contain the searched for keywords.

The results page 610 can also comprise a search button 670. For example, if a user desires to alter the search keywords 540, the user can edit them directly from the results page and reexecute the search, with, for example, selection of the search button 670, with, for example, the click of a mouse button. Additionally, a user can stop the search upon selection of the stop search button 680. For example, if a user begins the search and a desired result, or hit, appears in one of the result boxes, the search can then be stopped.

Furthermore, a user can directly edit the URL, or context information 515, from the results page. If, for example, a user determines the desired information was not located with the search, user could, for example, broaden the context information with, for example, wildcard characters.

As with a traditional search engine, the results 645 and 655 can be hyperlinks to the actual web page or portion thereof containing the keywords. Thus, if a user selects, for example, with a click of a mouse, one of the results, the user is taken to the web page that corresponds to that particular result, or hit.

Figure 5:
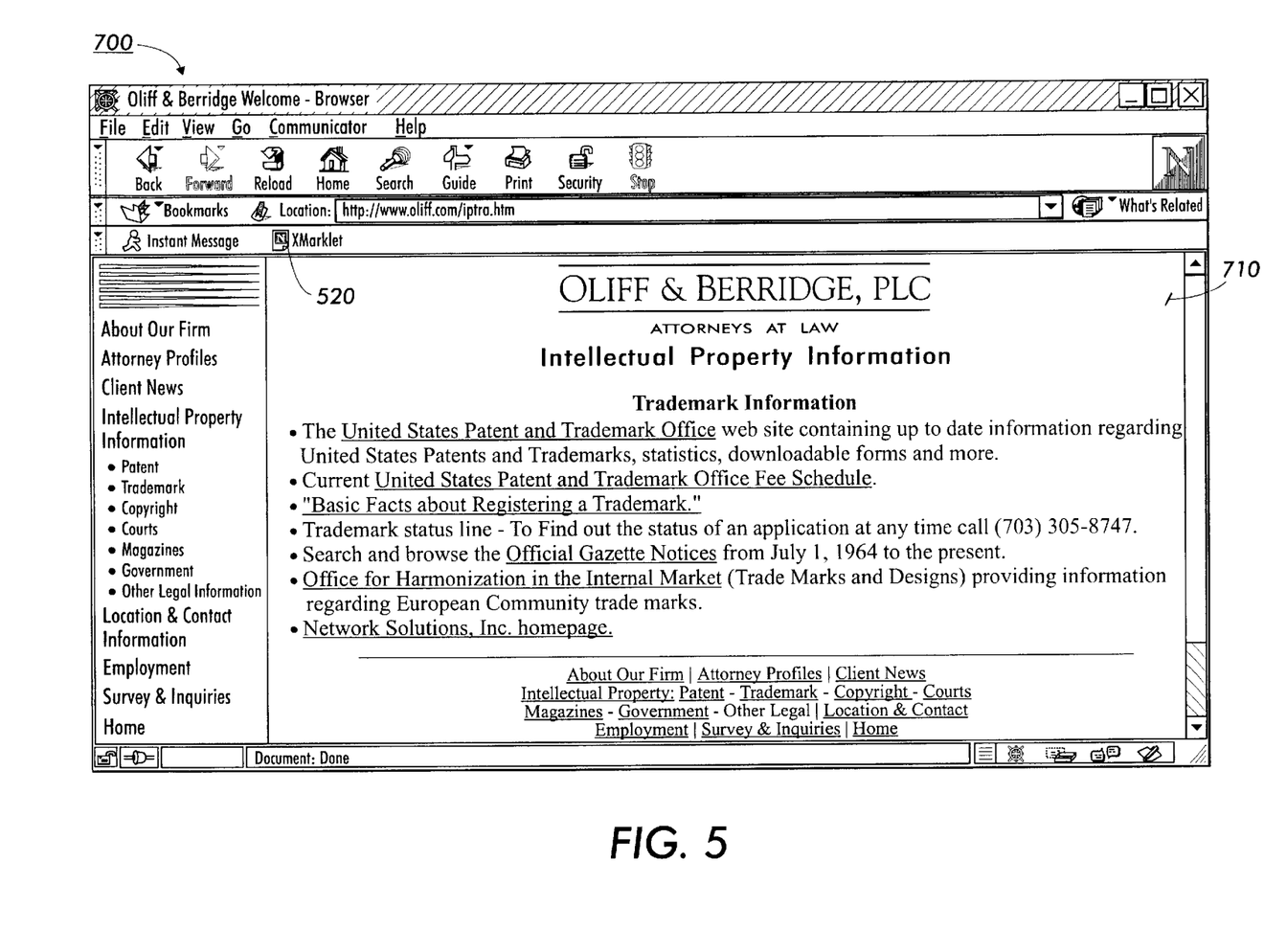
FIG. 5 is a third exemplary web page illustrating the result of selecting a "hit" in the result web page of FIG. 3.

FIG. 5 illustrates an exemplary web page 710 on a browser interface 700. The exemplary web page is displayed upon selection of one of the results, or hits, in the results page. The search initiate button 520 can also be present on this page to facilitate additional searching. Thus, a user can invoke a new search, which could, for example, include the URL of the result page as the default context information, at any time while browsing a distributed network.

Figure 6:
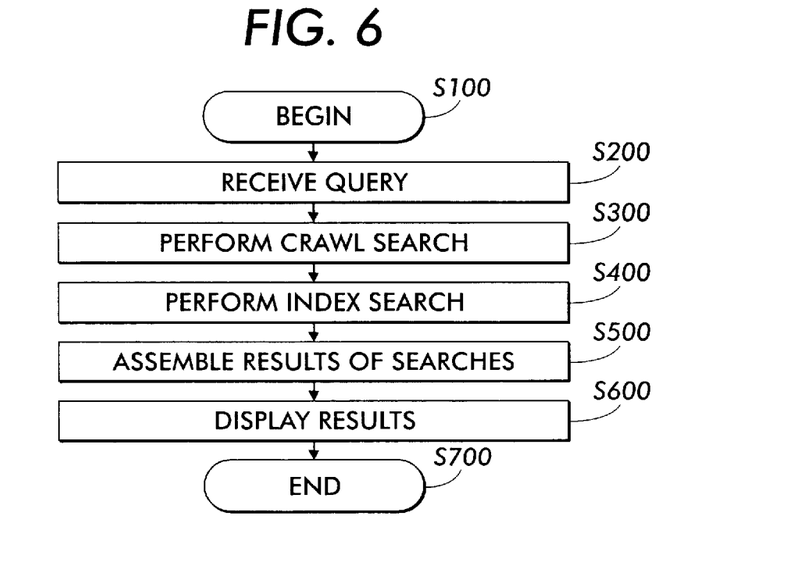
FIG. 6 is a flowchart outlining one exemplary embodiment of the method for performing crawl searches and index searches according to this invention.

FIG. 6 is a flowchart outlining one embodiment of a method for searching distributed networks according to this invention. Control begins in step S100, and continues to step S200 where a query is received. Next, in step S300, the crawl search is performed. Then, in step S400, the index search is performed. Control then continues to step S500.

In step S500, the results of the searches are assembled. Next, in step S600, the results are displayed. Control then continues to step S700 where the control sequence ends.

Figure 7:
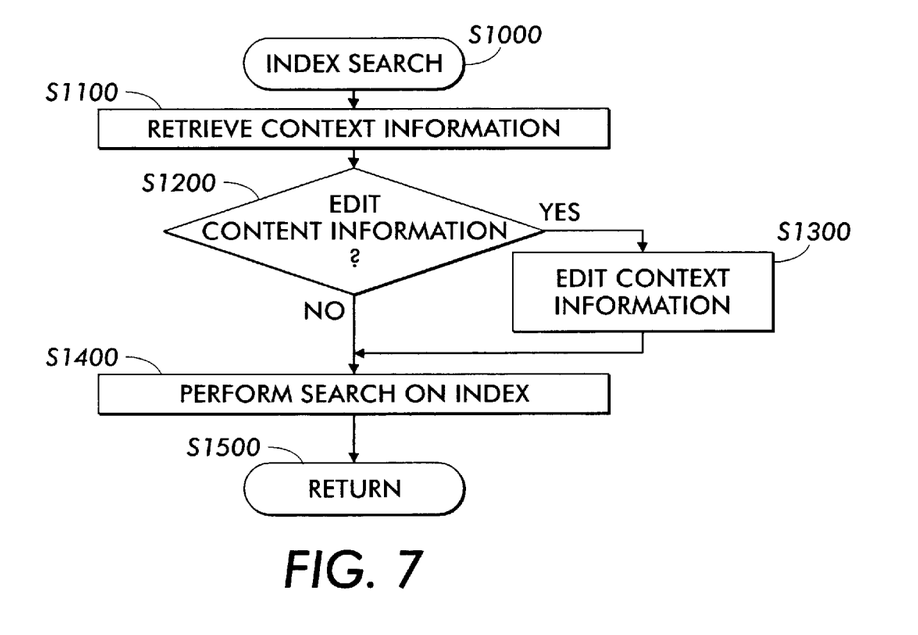
FIG. 7 is a flowchart outlining in greater detail the index search step of FIG. 6.

FIG. 7 is a flowchart outlining one exemplary embodiment of the performed index search step shown in FIG. 6 in greater detail. Control begins in step S1000 and continues to step S1100 where the context information is retrieved. Next, in step S1200, a determination is made whether the context information is to be edited. If the context information is to be edited, control continues to step S1300. Otherwise, control jumps to step S1400. In step S1300, the context information is edited. Control then continues to step S1400.

In step S1400, the index search is performed. Control then continues to step S1500 where control returns to step S500.

Figure 8:
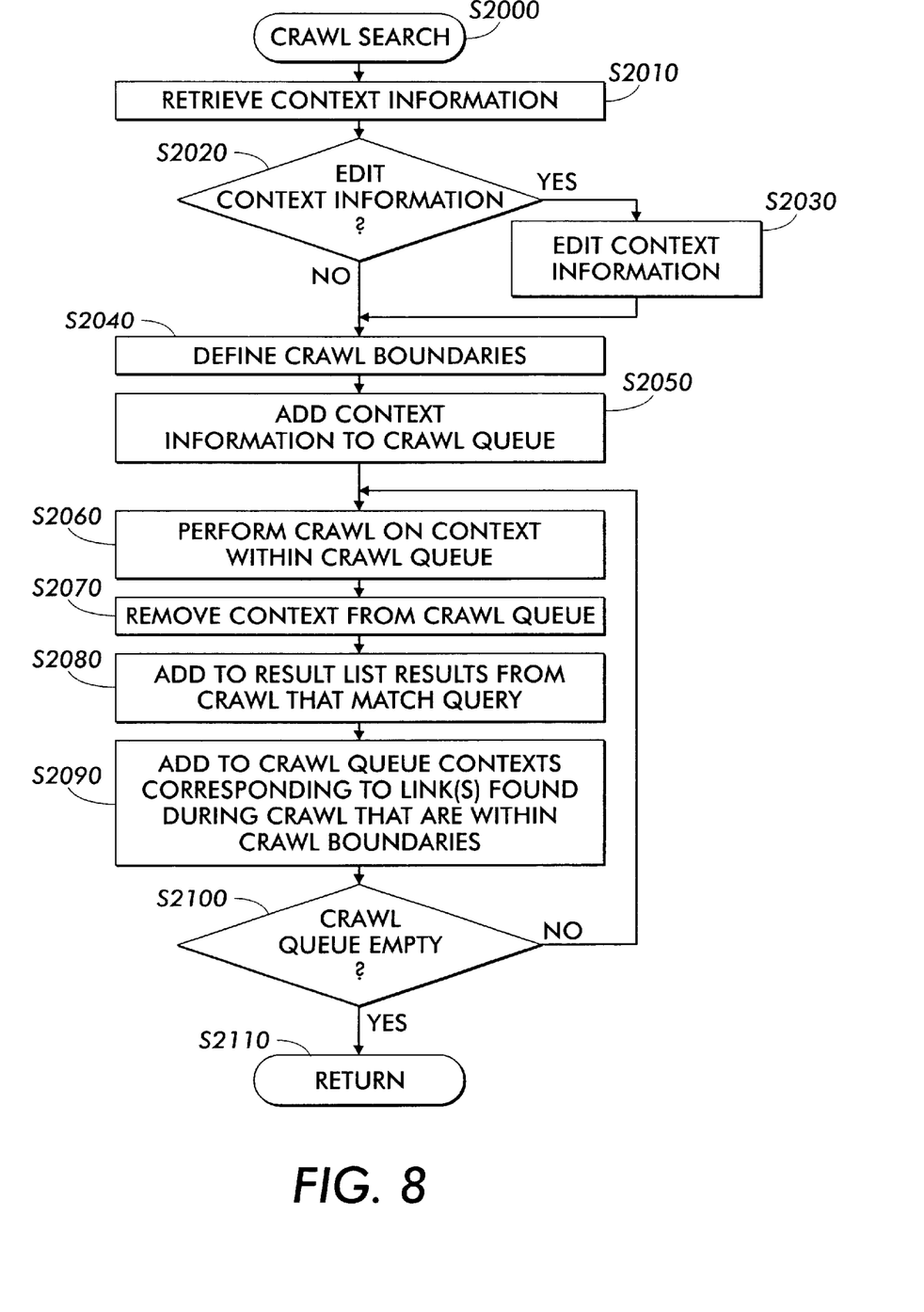
FIG. 8 is a flowchart outlining greater detail the contextualized crawl search step of FIG. 6.

FIG. 8 is a flowchart outlining one exemplary embodiment of the crawl search step shown in FIG. 6 in greater detail. Control commences in step S2000, and continues to step S2010 where the context information is retrieved. Next, in step S2020, a determination is made whether the context information should be edited. If the context information is to be edited, control continues to step S2030 for editing of the context information. Otherwise, control jumps to step S2040.

In step S2040, the crawl boundaries are defined. Next, in step S2050 the context is added to a crawl queue. Then, in step S2060, the crawl search is executed on the context within the crawl queue. Control then continues to steps S2070.

In step S2070, the context is removed from the crawl queue. Next, in step S2080, the results that match the query are added to the result list. Then, in step S2090, the contexts, if any, corresponding to the link(s) found during the crawl search that are within the crawl boundaries are added to the crawl queue. Control then continues to step S2100.

In step S2100, a determination is made whether the crawl queue is empty. If the crawl queue is not empty, control jumps back to step S2060. Otherwise, control continues to step S2110 where the control sequence returns to step S500.

As shown in FIG. 1, the search system is preferably implemented either on a single program general purpose computer or separate program general purpose computer. However, the search system can also be implemented on a special purpose computer, a programmed microprocessor or microcontroller and peripheral integrated circuit element, and ASIC, or other integrated circuit, a digital signal processor, a hardwired electronic or logic circuit such as a discrete element circuit, a programmable logic device such as a PLD, PLA, FPGA, PAL, or the like. In general, any device, capable of implementing a finite state machine that is in turn capable of implementing the flowcharts shown in FIGS. 6–8 can be used to implement the search system.

Furthermore, the disclosed method may be readily implemented in software using object or object-oriented software development environments that provide portable source code that can be used on a variety of computer or workstation hardware platforms. Alternatively, the disclosed search system may be implemented partially or fully in a hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The search systems and methods described above, however, can be readily implemented in hardware or software using any known or later-developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this case, the methods and systems of this invention can be implemented as a routine embedded on a personal computer such as Java® or CGI script, as a resource residing on a server or graphics work station, as a routine embedded in a dedicated search control system, web browser, web TV interface, PDA interface, or the like. The search system can also be implemented by physically incorporating the system and method into a software and/or hardware system, such as the hardware and software systems of a graphics workstation or dedicated search control system.

It is, therefore, apparent that there has been provided, in accordance with the present invention, systems and methods for searching distributed networks. While this invention has described the conjunction preferred embodiments thereof, it is evident that many alternatives, modifications, and variations are only apparent to those skilled in the art. Accordingly, Applicants intend to embrace all such alternatives, modifications and variations that follow in the spirit and scope of this invention.

What is claimed is:

1. A system that performs an index search and a crawl search on a distributed network comprising:
    a crawl search circuit that performs a crawl search in real-time for at least one keyword within a context; and
    an index search circuit that performs an index search of at least one index for the at least one keyword,
    the index search of at least one index for the at least one keyword being performed in parallel with the crawl search in real-time for at least one keyword within the context.

2. The system of claim 1, further comprising a browser interface that allows a user to navigate through a distributed network.

3. The system of claim 2, wherein the index search and the crawl search are initiated through the selection of a search tool associated with the browser interface.

4. The system of claim 1, further comprising a query development circuit that forwards the at least one keyword and the context information received from a browser interface to the crawl search circuit and the index search circuit.

5. The system of claim 1, wherein a query development circuit retrieves the context information from the browser interface.

6. The system of claim 1, further comprising a result development circuit that assembles results of the crawl search and the index search.

7. The system of claim 6, further comprising a display device that displays the assembled results of the crawl search and the index search.

8. The system of claim 1, wherein the index search includes the context in its search of the at least one index.

9. The system of claim 1, wherein the context is at least one of a Uniform Resource Locator (URL), an Internet Protocol address (IP address), a File Transfer Protocol address (FTP address), a directory, a domain name or a universal resource name.

10. The system of claim 1, wherein the at least one query also comprises one or more Boolean operands.

11. A method that performs an index search and a crawl search on a distributed network comprising:
    performing a crawl search in real-time for at least one keyword within a context; and
    performing an index search of at least one index for the at least one keyword,
    the index search of at least one index for the at least one keyword being performed in parallel with the crawl search in real-time for at least one keyword within the context.

12. The method of claim 11, further comprising assembling results of the crawl search and the index search.

13. The method of claim 11, further comprising adding to a result list the context matching results of the crawl search and the index search.

14. The method of claim 11, further comprising adding to a crawl queue the contexts corresponding to one or more links found during the crawl search.

15. The method of claim 14, wherein the context is added to the crawl queue if the context is within a crawl boundary.

16. The method of claim 11, further comprising detecting the context based on a user's location within a distributed network.

17. The method of claim 16, further comprising editing the detected context.

18. The method of claim 11, further comprising defining the breadth of the crawl search.

19. The method of claim 11, further comprising displaying the results of the crawl search and the index search.

20. The method of claim 11, wherein the context is at least one of a Uniform Resource Locator (URL), an Internet Protocol address (IP address), a File Transfer Protocol address (FTP address), a directory, a domain name or a universal resource name.

21. The method of claim 11, wherein the at least one query also comprises one or more Boolean operands.

22. An information storage medium that performs an index search and a crawl search on a distributed network comprising:

information that performs a crawl search in real-time for at least one keyword within a context; and information that performs an index search of at least one index for the at least one keyword, the index search of at least one index for the at least one keyword being performed in parallel with the crawl search in real-time for at least one keyword within the context.

23. The information storage medium of claim 22, further comprising information that assembles results of the crawl search and the index search.

24. The information storage medium of claim 22, further comprising information that adds to a result list the results of the crawl search and the index search.

25. The information storage medium of claim 22, further comprising information that adds to a crawl queue the contexts corresponding to one or more links found during the crawl search.

26. The information storage medium of claim 25, wherein the context is added to the crawl queue if the context is within a crawl boundary.

27. The information storage medium of claim 22, further comprising information that detects the context based on a user's location within a distributed network.

28. The information storage medium of claim 27, further comprising information that edits the detected context.

29. The information storage medium of claim 22, further comprising information that defines the breadth of the crawl search.

30. The information storage medium of claim 22, further comprising information that displays the results of the crawl search and the index search.

31. The information storage medium of claim 22, wherein the context is at least one of a Uniform Resource Locator (URL), an Internet Protocol address (IP address), a File Transfer Protocol address (FTP address), a directory, a domain name or a universal resource name.

32. The information storage medium of claim 22, wherein the at least one query also comprises one or more Boolean operands.

* * * * *